United States Patent [19]

McClure

[11] Patent Number: 5,355,113

[45] Date of Patent: Oct. 11, 1994

[54] SERIALIZED DIFFERENCE FLAG CIRCUIT

[75] Inventor: David C. McClure, Carrollton, Tex.

[73] Assignee: SGS Thomson Microelectronics, Inc., Carrollton, Tex.

[21] Appl. No.: 901,667

[22] Filed: Jun. 22, 1992

[51] Int. Cl.$^5$ .............................................. G06F 7/02
[52] U.S. Cl. ................................. 340/146.2; 307/355
[58] Field of Search ........................ 307/355; 340/146.2

[56] References Cited

U.S. PATENT DOCUMENTS

| 3,196,283 | 7/1965 | Flattau | 307/355 |
| 3,278,761 | 10/1966 | Goyer | 307/355 |
| 4,935,719 | 6/1990 | McClure | 340/146.2 |
| 5,027,330 | 6/1991 | Miller | 365/239 |
| 5,084,841 | 1/1992 | williams et al. | 365/189.07 |

FOREIGN PATENT DOCUMENTS

| 0395210A3 | 3/1990 | European Pat. Off. | G06F 7/62 |
| 0395210A2 | 3/1990 | European Pat. Off. | G06F 7/62 |

OTHER PUBLICATIONS

J. Daniels "Circuits for fast binary attition" Electronic Engineering vol. 62, No. 760, Apr. 1990, London GB, pp. 27–28.

Primary Examiner—Margaret R. Wambach
Attorney, Agent, or Firm—Kenneth C. Hill; Lisa K. Jorgenson; Richard K. Robinson

[57] ABSTRACT

Difference flag logic suitable for use in a FIFO memory is modified to quickly generate FIFO flag status without the use of subtractor circuitry. Bit comparators, which together comprise a magnitude comparator, determine if a first bit is less than, equal to, or greater than a second bit, and operate to produce a composite comparator output. The subtractor function is replaced by offsetting the read count from the write count by a value equal to the desired FIFO flag value. In addition, control of selected bits, such as the most significant bits (MSBs), of the numbers is included and may be used as necessary to avoid a wrap-around condition.

25 Claims, 2 Drawing Sheets

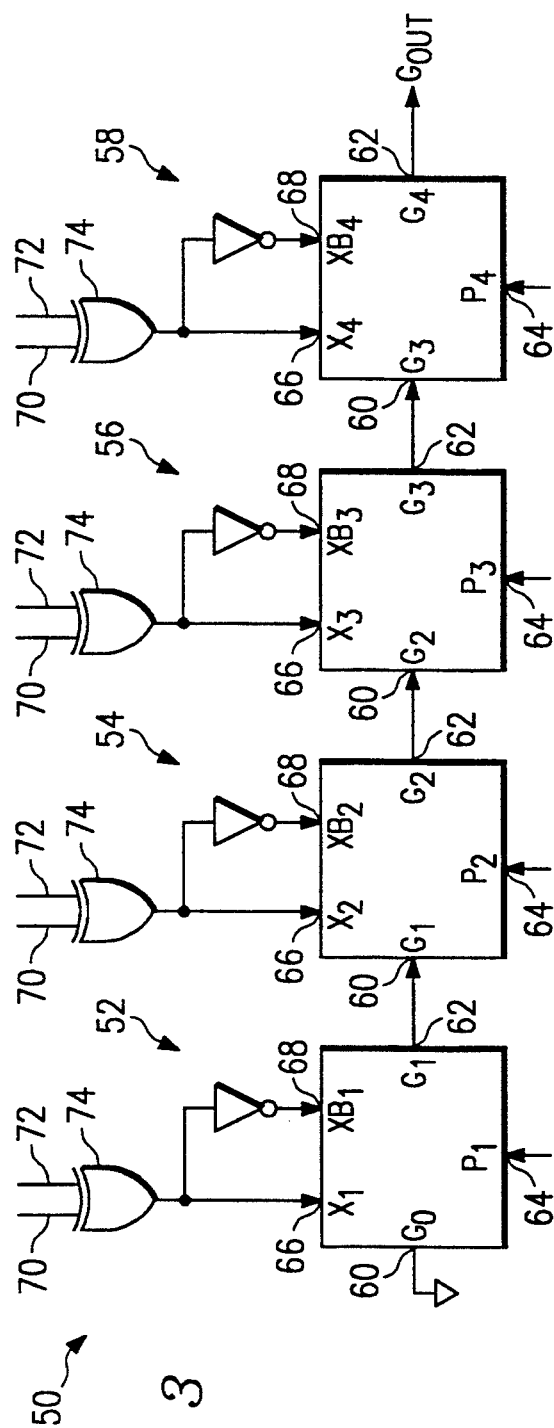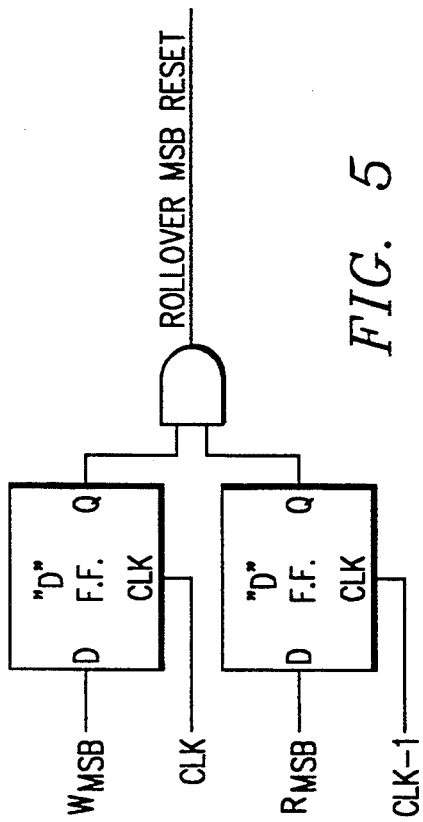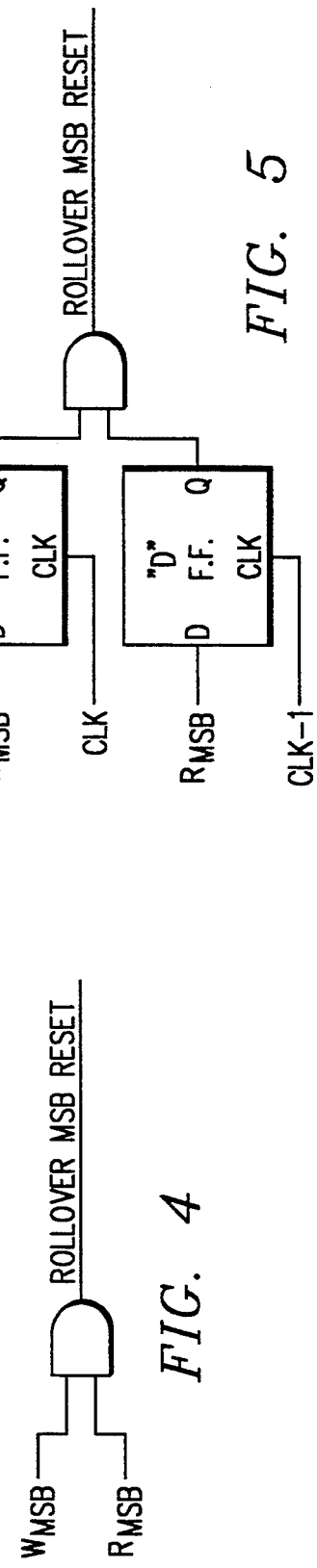
FIG. 3
FIG. 5
FIG. 4

SERIALIZED DIFFERENCE FLAG CIRCUIT

The subject matter of the present application is related to copending U.S. application, titled "Parallelized Difference Flag Logic", Ser. No. 07/890,919, filed on May 29, 1992, currently pending, assigned to the assignee hereof, which is herein incorporated by reference.

BACKGROUND OF THE INVENTION

1. Field of the Invention

The present invention relates generally to integrated circuits, and more specifically to a difference flag circuit for use in FIFO memories.

2. Description of the Prior Art

First In First Out (FIFO) memories are used in a variety of applications as an interface between two or more devices which transmit data at different rates of speed. Typical interface applications for FIFOs include placement between a computer and a printer or between a computer and a high speed modem. Because of the speed difference between devices, data stored inside a FIFO may be read out of the FIFO at a different rate than it was written into the FIFO. Since FIFOs are capable of receiving data at a rate different than the rate at which data is read, it is important to quantify the amount of data in the FIFO. Therefore, a FIFO has one or more flags which indicate the data status of the FIFO. Typical FIFO flags indicate full, empty, and half-full data status.

FIFO flag circuitry has historically included comparators and subtractors. The subtractor determines the difference between two values being compared. That difference is then presented as an input to a corresponding comparator. The comparator determines the relationship between two values and whether they are equal or unequal to each other. The appropriate comparator output signal is then generated. The FIFO flag signal is not determined until the subtractors and the comparators have completed their tasks. U.S. Pat. No. 4,974,241, issued Nov. 27, 1990 and U.S. Pat. No. 4,935,719 issued Jun. 19, 1990 both in the name of inventor David C. McClure, discuss use of serial subtractors and serial comparators to generate FIFO flag logic in the prior art. Traditionally, subtractor circuitry has been slower than comparator circuitry, and so generation of the FIFO flag was impeded as the comparator circuitry waited on the subtractor circuitry. By eliminating the need for subtractors in FIFO flag logic circuitry, the FIFO flag signal may be more quickly generated. U.S. Pat. No. 4,891,788 by inventor Gerard A. Kreifels which issued Jan. 2, 1990 gives insight on prior art techniques for generating FIFO flag logic without the use of a subtractor.

In the prior art, serial magnitude comparators are a common form of comparator circuits. They have a number of individual bit comparators that together serially determine the magnitude of a number relative to another number. First, the least significant bits (LSBs) of the two numbers are compared before comparing the next bits, the LSB+1. This process continues serially until the most significant bits (MSBs) are compared.

The individual bit comparators which comprise a serial magnitude comparator have four inputs: two inputs derived from the two bits to be compared, an input from the compare output of the previous bit comparator, and an input equal to one of the two bits being compared. The compare output of a bit comparator is input to the subsequent bit comparator and reflects whether the magnitude of one bit is equal to, less than, or greater than the magnitude of the second bit. If the two bits being compared are equal, then the compare input is passed through the bit comparator as the compare output. If, however, the two bits are unequal in magnitude, then the input equal to the first bit of the two bits being compared is passed through as the compare output. This comparison process starts with the least significant bit (LSB) comparator and continues serially until the most significant bit (MSB) comparator finishes its comparison operation. The bit comparator with the highest order bit of difference determines the state of the final compare output.

The gate delays associated with magnitude comparators and subtractors can have an adverse effect on generating a FIFO flag signal in a timely manner. Prior art FIFO flag logic, which is dependent on the comparator and subtractor, must be generated quickly. If the magnitude comparator is slow, it will have an adverse affect on how quickly flag logic may be generated and overall FIFO performance will suffer. A fundamental way to enhance the speed at which FIFO flag logic is generated is to eliminate the need for subtractor circuitry altogether, it would be desirable to accomplish this using current serial magnitude comparator design.

SUMMARY OF THE INVENTION

Difference flag logic suitable for use in a FIFO memory is modified to quickly generate FIFO flag status without the use of subtractor circuitry. Bit comparators, which together comprise a magnitude comparator, determine if a first bit is less than, equal to, or greater than a second bit, and operate to produce a composite comparator output. The subtractor function is replaced by offsetting the read count from the write count by a value equal to the desired FIFO flag value. In addition, control of selected bits, such as the most significant bits (MSBs), of the numbers is included and may be used as necessary to avoid a wrap-around condition.

BRIEF DESCRIPTION OF THE DRAWINGS

The novel features believed characteristic of the invention are set forth in the appended claims. The invention itself, however, as well as a preferred mode of use, and further objects and advantages thereof, will best be understood by reference to the following detailed description of an illustrative embodiment when read in conjunction with the accompanying drawings, wherein:

FIG. 3 is a schematic diagram of a serial magnitude comparator according to the present invention.

FIG. 4 is a schematic diagram showing logic for determining the Rollover MSB Reset signal.

FIG. 5 is a schematic diagram showing an alternate embodiment for determining the Rollover MSB Reset signal.

DESCRIPTION OF THE PREFERRED EMBODIMENT

A FIFO is a First In First Out memory typically used in applications between machines which transmit and receive data at different rates of speed: for instance, between a computer and a printer. Writing data into the FIFO at a different rate of speed than reading data out of the FIFO makes it necessary to know how much data is actually in the FIFO at any particular point in time. The FIFO memory outputs its data status through the use of a FIFO flag. Comparators are frequently used in conjunction with subtractors in FIFO memory circuits to generate FIFO flags. Subtractors are commonly slower than comparators, so it is desirable to have FIFO flag circuitry which does not utilize subtractors. Also, eliminating subtractor circuitry reduces required layout area and associated circuitry.

The FIFO flag output indicates the data status of the FIFO and so may indicate that the FIFO is full, half full, and empty, for instance, in order to determine FIFO data status, it is necessary to track how many bits have been written in and how many bits have been read out of the FIFO. Also, it is necessary to know the relationship between the magnitude of two numbers, such as a write count and a read count, and whether the magnitude of one number is equal to, less than, or greater than the magnitude of the second number. Comparing the magnitude of two numbers is accomplished through the use of a magnitude comparator circuit inside the FIFO.

Figure 1:
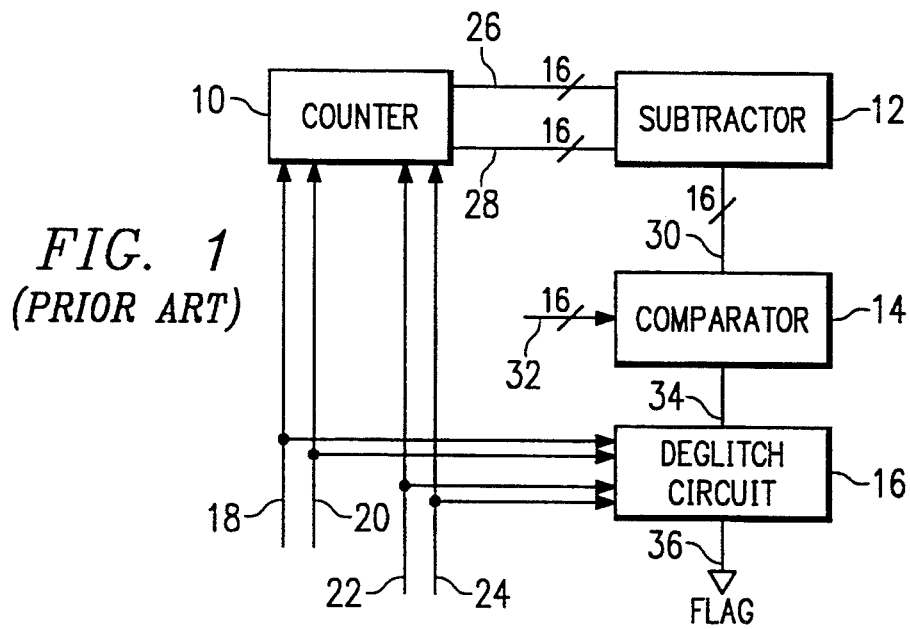
FIG. 1 is a block diagram of a FIFO flag generation circuit according to the prior art.

Referring to FIG. 1, a block diagram of a FIFO Flag generation circuit according to the prior art is shown. The FIFO Flag has a counter block 10, a subtractor block 12, a comparator block 14, and a deglitch block 16. The write clock 18, the read clock 20, the write reset clock 22, and the read reset clock 24 are input signals to both the counter block 10 and the deglitch block 16. The counter block 10 takes these input signals and generates a write count 26 and a read count 28 which are input to the subtractor block 12 which in turn outputs a difference signal 30. This difference signal 30 and a program value 32 are input to the comparator block t4 which compares them in order to generate an output compare signal 34. As is well known in the art, the program value 32 is set to different values depending on the type of flag signal 36, such as empty, half full, or full, to be generated. Finally, the compare signal 34 as well as the write clock 18, the read clock 20, the write reset clock 22, and the read reset clock 24 are input to the deglitch block 36 which generates a flag output signal 36.

Figure 2:
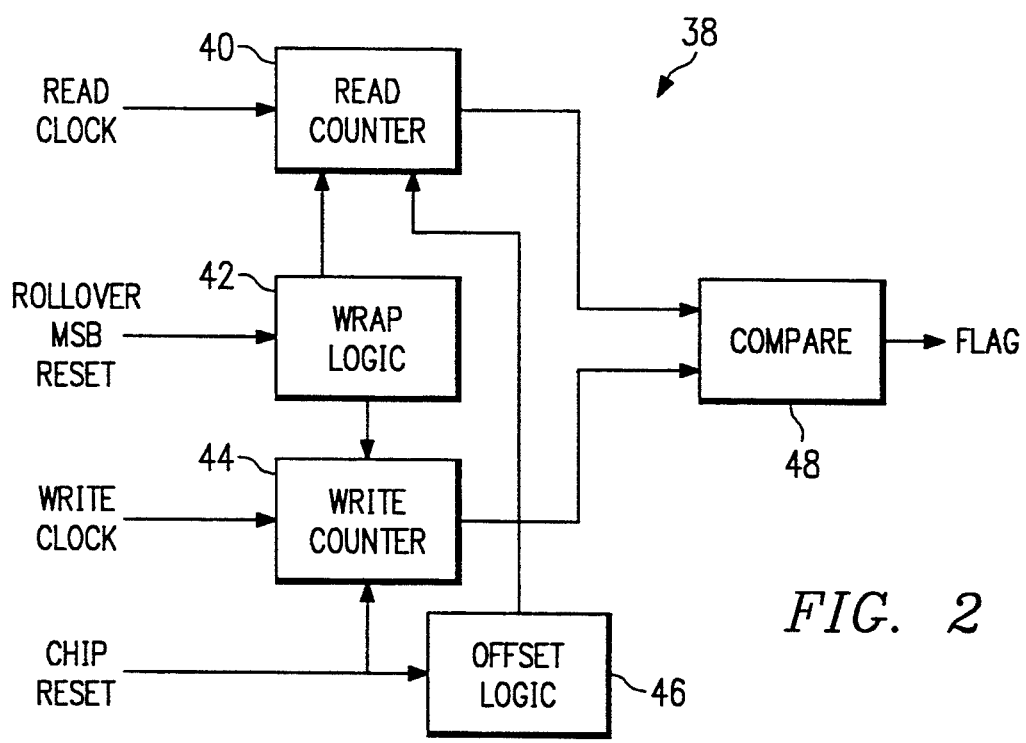
FIG. 2 is a block diagram of a FIFO flag generation circuit according to the present invention.

Referring to FIG. 2, a block diagram 38 of a FIFO flag generation circuit according to the present invention is shown. A read clock signal and a write clock signal are provided as inputs to the read counter 40 and the write counter 44, respectively. Compare block 48 uses the output signals of the read counter 40 and the write counter 44 to generate an output Flag signal. During a chip reset, the write counter 44 is reset to all zeros, and read counter 40 is reset to the required flag value as determined by offset logic 46. The offset is normally determined by forcing the write and read counters to some predetermined value upon chip reset. The offset of the read counter from the write counter allows a FIFO flag signal to be generated without the use of subtractor circuitry as is the case in the prior art. Rollover MSB Reset is a signal determined by performing logic on the Most Significant Bit (MSB) of the read and write counters. When the MSBs of both the read and write counters are equal to 1, wrap logic 42 resets the read and write counter MSBs to 0. The Rollover MSB Reset signal prevents a wraparound problem from occurring and will be discussed in more detail later.

FIG. 3 shows a schematic diagram of a serial magnitude comparator according to the present invention which is responsible for determining the relationship between the magnitude of two numbers. The serial magnitude comparator is comprised of bit comparators which operate in a serial fashion to produce a final magnitude comparator output. The number of bit comparators needed is a function of the number of bits in the two numbers being compared.

The magnitude comparator is responsible for determining the relationship between the magnitude of two numbers. Magnitude comparator 50 has a plurality of bit comparators 52, 54, 56, and 58 which determine the status of the relative magnitude of the two numbers being compared. The number of bit comparators needed is a function of the number of bits in the two numbers being compared. Each bit comparator compares a bit, at a certain bit position, from both numbers. For example, the magnitude status of the first bit to be compared, 70, is compared to that of the second bit 72 to determine if it is equal to, less than, or greater than the second bit 72. Every bit comparator has four inputs. The two bits to be compared, 70 and 72, are input to an exclusive OR gate 74, the output of which is input 66 of bit comparators 52, 54, 56, and 58; signal 66 is inverted to provide input 68. Input 68, which is simply the inverse of input 66, could easily be generated internal to the bit comparator, in which case it would not be an input signal. Other inputs to the bit comparators are the output of the previous bit comparator 60, and input 64, the first bit of the two bits being compared. Input 64 is different from program value 32 shown in FIG. 1. Input 64 can be any binary number, whereas program value 32 of FIG. 1 is equal to a fixed program value which defines the value of the FIFO flag. FIG. 3 shows two binary numbers being compared whereas FIG. 1 shows a binary number being compared with a fixed value represented by program value 32.

The bit comparators of FIG. 3 detect the relative magnitude of the two numbers being compared. If bits 70 and 72 are identical in magnitude, then compare output 62 is equal to compare input 60. However, if 70 and 72 are different in magnitude, compare output 62 is determined according to the design rule: If input bit 70 is greater than input bit 72, compare output 62 is equal to 1. Conversely, if input bit 70 is less than input bit 72, compare output 62 is equal to 0. Bit inputs 70 and 72 pass through an exclusive OR gate. Therefore, if bit 70 and bit 72 are the same, then input 66 will be equal to 0 and input 68, which is inverted, will be equal to 1. But, if bit 70 and bit 72 are different in magnitude, then input 66 will be equal to 1 and input 68 will be equal to 0. The truth table below shows compare output 62 in terms of inputs 66 and 68.

TABLE I

| Input 66 | Input 68 | Output 62 |
| --- | --- | --- |
| 1 | 0 | Input 64 |
| 0 | 1 | Input 60 |

This table shows that when the two bits to be compared, 70 and 72, are different, then compare input 64 is passed out as compare output 62. Conversely, when bits 70 and 72 are the same in magnitude, the compare input from the previous bit comparator 60 is passed out as compare output 62. Compare input 60 of the initial bit comparator 52 is tied to a fixed value which can be $V_{cc}$ or ground as shown in FIG. 3. Thus, if input bits 70 and 72 are the same, then a low will be passed to the compare output 62, assuming that initial bit comparator 52 is tied to ground as shown in FIG. 3. In turn, bit comparator 54 receives a low input signal 60 and, if input bits 70 and 72 of bit comparator 54 have the same magnitude, compare output 62 will again be 0, passing out incoming compare input 60. This process starts with the least significant bit (LSB) comparator 52 and continues serially until the most significant bit (MSB) comparator 58 has finished its compare operation. Only when the magnitudes of the MSBs have been compared will a final compare output 62 be generated. The highest order bit comparator with bit difference determines the state of the final compare output 62 of bit comparator 58. When the two bits being compared are different, then compare input 64 is passed out as compare output 62.

In the preferred embodiment of the present invention, the need for subtractor circuitry is replaced by setting the read counter to a value different from the value of the write counter. The offset value is equal to the value of the desired FIFO flag. FIG. 2 shows how offset logic is used during a chip reset to set the read counter to its reset value. Also, the fact that a subtractor is not used in the FIFO flag logic circuitry means that provisions must be made to safeguard the integrity of the FIFO flag. For purposes of simplicity, consider a FIFO with 8 data locations which generates a half full flag. For the half full flag, the flag value will be equal to 4 which is half of 8. During a chip reset, the write counter reset value is equal to 0 (0000) while the read counter reset is offset from the write counter reset by the value of the flag. Therefore, the read counter reset is equal to 4 (0100). The difference between the write counter reset and the read counter reset is 4, the value of the FIFO flag. FIG. 2 shows that, during a chip reset, offset logic ensures that the read counter is reset to a value offset from the write counter by the value of the FIFO flag.

As shown in FIG. 3 and described above, when the write bit is greater than the corresponding read bit, compare output 62 is equal to a logic high. However, when the write bit is less than the corresponding read bit, compare output 62 is equal to a logic low. When the write bit is equal to the corresponding read bit, compare input 60 is passed through as compare output 62. Upon reset, the read counter and write counter are equal to 0100 and 0000, respectively. After performing 3 writes, the read counter is still 0100, but the write counter is now 0011. And, because the write counter is less than the read counter, compare output signal 62 of bit comparator 58 is equal to 0. In this 4 bit example, only 4 bit comparators are used to generate the final compare output signal 62 of bit comparator 58. However, in a more realistic 16 bit example, 16 bit comparators would be needed to generate the final compare output signal. Next, 1 more write is performed meaning that the FIFO is now half full. After the fourth write, the read counter is still 0100, but the write counter is now equal to 0100. At this point, since the read and write counters are equal, compare output signal 62 of bit comparator 58 is still equal to 0 which accurately reflects a half full flag. One more write means that the write counter, now equal to 0101, is greater than the read counter. Therefore, compare output signal 62 of bit comparator 62 changes in value and is now equal to 1. This value of 1 accurately reflects greater than a half-full condition, namely, equal to or greater than half full+1.

The above example worked fine, because no wrap-around condition occurred. The following example builds on the above example and illustrates the wrap-around problem for a half-full flag. Starting at the reset condition, the read and write counter are 0100 and 0000, respectively. Upon 3 writes, the flag is equal to half-full−1 and the write counter increments to 0011. Compare output signal 62 of bit comparator 58 is equal to 0 since the write counter is less than the read counter. Next, 10 reads and 10 writes are performed, causing the read and write counters to increment to 1110 and 1101, respectively. Because the same numbers of reads as writes was performed, the flag is still equal to half full−1, and compare output signal 62 of bit comparator 58, which is still equal to 0, accurately reflects the flag status. An additional write brings the total number of writes to 14 and the number of reads to 10. At this point, the flag is half-full as signified by the difference of 4 between the read and write counts. Read counter remains 1110 and the write counter increments one to 1110. Compare output signal 62 of bit comparator 58 is equal to 0, correctly representing the half-full flag status. After still another write, the read and write counters are 1110 and 1111, respectively. This is the first time the write counter is greater than the read counter, and so the compare output signal 62 of bit comparator 58 is equal to 1, indicating the new flag status is half full+1. The wrap-around condition occurs in the next step. Performing 1 more write, makes the write count "wrap-around" and reset itself to 0000; the read counter is still equal to 1110. According to the logic rule used, since the write counter is less than the read counter, compare output signal 62 of bit comparator 58 is equal to 0. However, the zero value of compare output signal 62 of bit comparator 58 does not accurately reflect the flag status which is half full+2. The wrap-around of the write counter has caused an error condition.

To handle the wrap-around condition described above, the most significant bits (MSBs) of the read and write counter are reset to 0 when both are equal to 1. FIG. 2 shows the use of the Rollover MSB Reset signal to reset the MSBs of both the read and write counter. To illustrate the effectiveness of this method, consider the following example. After resetting the read and write counters and then performing 8 writes, the read and write counters are equal to 0100 and 1000, respectively. The FIFO is full, and compare output signal 62 of bit comparator 58 is equal to 1, which indicates an equal to or greater than half full+1 condition. Next 4 writes and 4 reads are performed, resulting in the read and write counters being incremented to 1000 and 1100, respectively. Compare output signal 62 of bit comparator 58 is equal to 1 since the FIFO is still full. After the 4 reads and writes, the MSB of both the read and write counter are equal to 1. At this point, both MSBs are reset to 0, resulting in a read count of 0000 and a write count of 0100. Compare output signal 62 of bit comparator 58 is still equal to 1, consistent with the FIFO still being full. Resetting of the MSBs to 0 could occur anytime before the write count wrapped around. In this case, resetting could be done during any of the subsequent 3 write cycles.

Consider now the wrap-around condition for a full flag example. In the full flag case, the read counter and write counter are set to 0111 and 0000, respectively. The difference between the counters is equal to 7 for the full flag case. Starting at a reset state and performing 7 writes yield a read count and write count of 0111 and 0111, respectively. Since the counts are equal, compare output signal 62 of bit comparator 58 is equal to 0.

When 1 more write is performed, the FIFO is full, the write count increments to 1000, and the write count is greater than the read count resulting in compare output signal 62 of bit comparator 58 being equal to 1. Performing 1 read cycle means that the FIFO is full−1, and both the write count and read count are equal to 1000. The MSBs are reset to 0, and the resultant read and write counts are 0000 and 0000, respectively. Compare output signal 62 of bit comparator 58 is equal to 0, accurately reflecting the fact that the FIFO is full−1. Resetting the read and write count MSBs to 0 when both the read and write counts are equal to 1000 could have been done anytime during the subsequent 7 write cycles, since wrap-around would not have happened until the eighth write cycle.

Finally, consider the empty flag example where the read and write reset values are both equal to 0000. At reset, compare output signal 62 of bit comparator 58 is 0 since the read and write counts are equal. After the first write, compare output signal 62 of bit comparator 58 is 1 since the FIFO is no longer empty. Likewise, during the next 7 writes, compare output signal is equal to 1. After the 7th write, the read and write count are 0000 and 1000, respectively. Performing 7 reads increments the read count to 0111. The read count is still less than the write count and so compare output signal 62 of bit comparator 58 is still equal to 1, accurately reflecting that the FIFO is not empty. 7 subsequent writes and 1 subsequent read increments the read and write count to 1000 and 1111, respectively. Since, at this point, the MSBs are both equal to 1, they must be reset to 0 before the write count wraps around the next write cycle. This is an example where the MSBs must be reset to 0 before the very next write. If this small amount of time is insufficient for a specific application, another bit may be added to the counter to allow for more time to reset the MSBs of the counters. In the empty flag example just described, a 5 bit counter instead of the 4 bit counter could be used with the 5th bit resettable when both MSBs are equal to 1. This would provide 8 additional cycles to perform the MSB reset function.

Resetting the read and write count MSBs is accomplished by the generation of a Rollover MSB Reset signal as shown in FIGS. 4 and 5. FIG. 4 is a schematic diagram showing logic for determining the Rollover MSB Reset signal. The MSBs of both the read and write counts are input to an AND logic gate. When both MSBs are equal to a 1, then the Rollover MSB Reset signal is also equal to a logic 1.

FIG. 5 is a schematic diagram showing an alternate embodiment for determining the Rollover MSB Reset signal. In this embodiment, the Rollover MSB Reset signal is synchronized to a clock signal(s). In FIG. 5, clock signals CLK and CLK-1 may or may not be the same clock. The MSBs of the read and write count, WMSB and RMSB are input to their respective D Flip Flop. Upon receipt of the clock signal input, the MSB is latched out of the D Flip Flop as output Q. The Q outputs from both D Flip Flops are gated into logic which produces a valid Rollover MSB Reset signal when both WMSB and RMSB are equal to a 1. The D Flip Flop could easily be replaced by a D latch which would generate the same Rollover MSB Reset signal. When a valid, logic high, Rollover MSB Reset signal is produced as shown in FIG. 4 or FIG. 5, then the MSB of the read count and the write count is reset to 0.

The serial difference flag logic described above has important advantages over the prior art FIFO flag generation circuitry. A read counter which is offset from the write counter by a value equal to the desired flag allows the FIFO flag to be generated without the use of a subtractor. The use of the Rollover MSB Reset signal prevents a wrap-around condition giving erroneous flag status. In the case where full, half-full, and empty FIFO flags are required, three distinct serial difference flag circuits as described above can be used. The three flag circuits may be laid out independently and physically separate from each other. In the prior art, it was necessary to lay out all flag circuitry in one large block, requiring chip area which is often hard to come by. It is much easier to fit three distinct flag circuits in available spaces in the overall FIFO layout. In addition to circuit space savings, the serial difference flag logic which does not use subtractors is less complex than prior art serial difference flag logic in that fewer components are needed.

In the invention, a magnitude comparator is used. A magnitude comparator employs true magnitude comparison, by detecting less than, equal to, or greater than conditions. A plain comparator such as that used in prior art flag logic, on the other hand, detects only an equal condition between two values. The use of the magnitude comparator eliminates flag arbitration problems as the read and write counts are skewed against each other across flag boundaries.

The serial magnitude comparator has been described in relation to a FIFO flag generation circuit. The magnitude comparator can also be used in a multitude of other applications such as in arithmetic logic units (ALUs) of computers where it is necessary to determine the magnitude of one number relative to that of a second number.

While the invention has been particularly shown and described with reference to two preferred embodiments, it will be understood by those skilled in the art that various changes in form and detail may be made therein without departing from the spirit and scope of the invention.

What is claimed is:

1. Difference flag circuitry, comprising:
   a comparator which compares the magnitude between multiple digital bits of a first binary value and corresponding multiple digital bits of a second binary value, and then generates an output signal indicative of whether the first binary value is larger than the second binary value; and
   means, connected to the comparator, for generating an output flag, wherein said first binary value is initially set to a value which is offset from said second binary value by a value selected to generate said flag.

2. The difference flag circuitry of claim 1, further comprising means for preventing said difference flag circuitry from indicating an incorrect number of data bits written into but not yet read from a memory.

3. The difference flag circuitry of claim 2, wherein said prevention means is provided by a reset input which is determined by performing logic on selected bits of said first binary value and said second binary value.

4. The prevention means of claim 3, wherein said selected bits are the most significant bits (MSBs) of said first binary value and said second binary value.

5. The difference flag circuitry of claim 2, wherein erroneous flag status is prevented by resetting selected bits of said first binary value and said second binary value to a predetermined state when said selected bits are both equal to a predetermined logic level based upon a reset input, thereby avoiding a wrap-around condition.

6. The difference flag circuitry of claim 5, wherein said selected bits are the most significant bits (MSBs) of said first binary value and said second binary value.

7. The difference flag circuitry of claim 1, wherein said comparator is a serial magnitude comparator comprising a plurality of bit comparators.

8. The serial magnitude comparator of claim 7, wherein each of said bit comparators generates a compare output which is input to the subsequent bit comparator.

9. The serial magnitude comparator of claim 8, wherein the initial bit comparator of said plurality of bit comparators has as its compare input a signal set to a predetermined level.

10. The serial magnitude comparator of claim 8, wherein each said bit comparator has a first value input, a second value input, and a third value input.

11. The serial magnitude comparator of claim 10, wherein said first value input is a one bit value determined by performing logic on the bit of said first binary value and the bit of said second binary value to be compared.

12. The serial magnitude comparator of claim 11, wherein said second value input is equal to the value of the bit of said first binary value to be compared.

13. The serial magnitude comparator of claim 10, wherein said third value input is the compare output signal generated by a previous bit comparator.

14. The difference flag circuitry of claim 1, wherein the bit of said first binary value and the bit of said second binary value are generated by counters.

15. The serial magnitude comparator of claim 14, wherein the bit of said first binary value and the bit of said second binary value to be compared are a FIFO read count and a FIFO write count, respectively.

16. A method for generating difference flag circuitry, comprising the steps of:
    setting a first multiple bit binary value input to a value which is offset from a second multiple bit binary value input by a value corresponding to a flag;
    incrementing the first and second inputs in response to reading and writing a value from a memory, respectively;
    comparing the magnitude between the first value input and the second value input by using a comparator which generates a final compare output indicative of whether the magnitude of said first value input is equal to, less than, or greater than the magnitude of said second value input; and
    generating a flag output when the first input value is greater than the second input value.

17. The method of claim 16, further comprising the step of preventing said difference flag circuitry from indicating an incorrect number of data bits written into but not yet read from a memory.

18. The method of claim 17, wherein said prevention is provided by a reset input which is determined by performing logic operations on selected bits of said first value input and said second value input.

19. The method of claim 18, wherein said selected bits are most significant bits (MSBs) of said first value input and said second value input.

20. The method of claim 17, wherein erroneous flag status is prevented by resetting selected bits of said first value input and said second value input to a predetermined state when said selected bits are both equal to a predetermined logic level based upon a reset input, thereby avoiding a wrap-around condition.

21. The method of claim 20, wherein said selected bits are most significant bits (MSBs) of said first value input and said second value input.

22. The method of 16, wherein said comparator is a serial magnitude comparator comprised of a plurality of bit comparators.

23. The method of claim 16, wherein comparison of the magnitude between said first value input and said second value input is used to generate a flag signal suitable for a FIFO.

24. The method of claim 16, wherein said first value input and said second value input are generated by counters.

25. The method of claim 24, wherein said first value input and said second value input are a FIFO read count and a FIFO write count, respectively.

* * * * *